(12) United States Patent
Miller et al.

(10) Patent No.: US 11,719,859 B2
(45) Date of Patent: Aug. 8, 2023

(54) ELASTOMERIC REFLECTION SUPPRESSOR

(71) Applicant: The Regents of the University of Colorado, Denver, CO (US)

(72) Inventors: David Miller, Boulder, CO (US); Robert R. McLeod, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 883 days.

(21) Appl. No.: 16/571,491

(22) Filed: Sep. 16, 2019

(65) Prior Publication Data

US 2020/0088911 A1 Mar. 19, 2020

Related U.S. Application Data

(60) Provisional application No. 62/731,422, filed on Sep. 14, 2018.

(51) Int. Cl.
| | |
|---|---|
| *G02B 1/115* | (2015.01) |
| *C08L 83/04* | (2006.01) |
| *C08K 3/04* | (2006.01) |
| *G02B 5/02* | (2006.01) |
| *G02B 26/08* | (2006.01) |
| *G02B 5/22* | (2006.01) |
| *B82Y 20/00* | (2011.01) |

(52) U.S. Cl.
CPC ............. *G02B 1/115* (2013.01); *C08K 3/04* (2013.01); *C08L 83/04* (2013.01); *G02B 5/0226* (2013.01); *G02B 5/0294* (2013.01); *G02B 5/223* (2013.01); *G02B 26/0875* (2013.01); *B82Y 20/00* (2013.01)

(58) Field of Classification Search
CPC .... G02B 1/115; G02B 5/0226; G02B 5/0294; G02B 5/223; G02B 26/0875; C08K 3/04; C08L 83/04; B82Y 20/00
USPC ........................................................ 359/586
See application file for complete search history.

(56) References Cited

U.S. PATENT DOCUMENTS 5,925,500 A * 7/1999 Yang ..................... G03F 7/202
430/300

OTHER PUBLICATIONS

Alim, Marvin D. et al., "High Dynamic Range (Δn) Two-Stage Photopolymers Via Enhanced Solubility Of A High Refractive Index Acrylate Writing Monomer," ACS Appl. Mater. Interfaces, vol. 10, pp. 1217-1224, Dec. 13, 2017.
(Continued)

*Primary Examiner* — Marin Pichler
*Assistant Examiner* — Mitchell T Oestreich

(57) ABSTRACT

Various embodiments of the present technology generally relate to reflection suppressors. More specifically, some embodiments use elastomeric materials doped with optical absorbers for temporary suppression of Fresnel reflections for multiple substrates spanning wide spectral and angular bandwidth. The refractive index of the elastomer can be tuned to match a substrate and thereby minimize reflection. Some embodiments can use the addition of different absorptive dopants to allow for either broadband or wavelength-selective reflection suppression. As performance is limited only by index mismatch, both spectral and angular performance significantly exceed that of anti-reflection coatings. After use, these light traps may be removed and reused without damaging the substrate. These films have uses in spectroscopic ellipsometry, holography, and lithography.

20 Claims, 12 Drawing Sheets

(56) References Cited

OTHER PUBLICATIONS

Ho, Yu-Hsuan et al., "Omnidirectional Antireflection Polymer Films Nanoimprinted By Density-Graded Nanoporous Silicon And Image Improvements In Display Panel," Optics Express, vol. 21, No. 24, pp. 29827-29835, Dec. 2, 2013.

Miller, David B. et al., "Suppression Of Parasitic Gratings With Broadband Elastomeric Light Trap," Proc. of SPIE, vol. 11030, pp. 1103009-1-1103009-6, Apr. 23, 2019.

Minot, Michael Jay, "Single-Layer, Gradient Refractive Index Antireflection Films Effective From 0.35 to 2.5 µ," J. Opt. Soc. Am., vol. 66, No. 6, pp. 515-519, Jun. 1976.

Minot, M. J., "The Angluar Reflectance Of Single-Layer Gradient Refractive-Index Films," J. Opt. Soc. Am., vol. 67, No. 8, pp. 1046-1050, Aug. 1977.

Mukherjee, S. P. et al., "Gradient-Index AR Film Deposited By The Sol-Gel Process," Applied Optics, vol. 21, No. 2, pp. 293-296, Jan. 15, 1982.

Owen, M. P. et al., "Internal Reflections In Bleached Reflection Holograms," Applied Optics, vol. 22, No. 1, pp. 159-163, Jan. 1, 1983.

Park, Eun-Mi et al., "Investigation Of The Effects Of Bottom Anti-Reflective Coating On Nanoscale Patterns By Laser Interference Lithography," Thin Solid Films, vol. 519, pp. 4220-4224, Feb. 24, 2011.

Pompea, Stephen M. et al., "Chapter 37—Black Surfaces For Optical Systems," Handbook of Optics, 2nd Edition, pp. 37.1-37.70, 1995.

Syms, R. R. A et al., "Noise Gratings In Silver Halide Volume Holograms," Appl. Phys. B, vol. 30, pp. 177-182, 1983.

Synowicki, R. A., "Suppression Of Backside Reflections From Transparent Substrates," Phys. Stat. Sol. (c) 5, No. 5, pp. 1085-1088, Mar. 18, 2008.

* cited by examiner

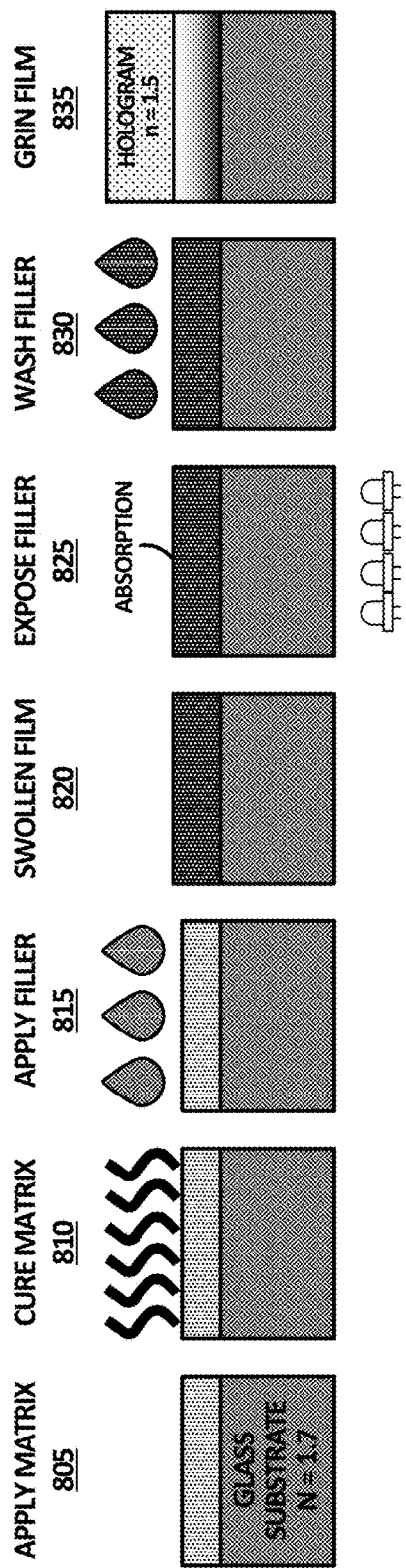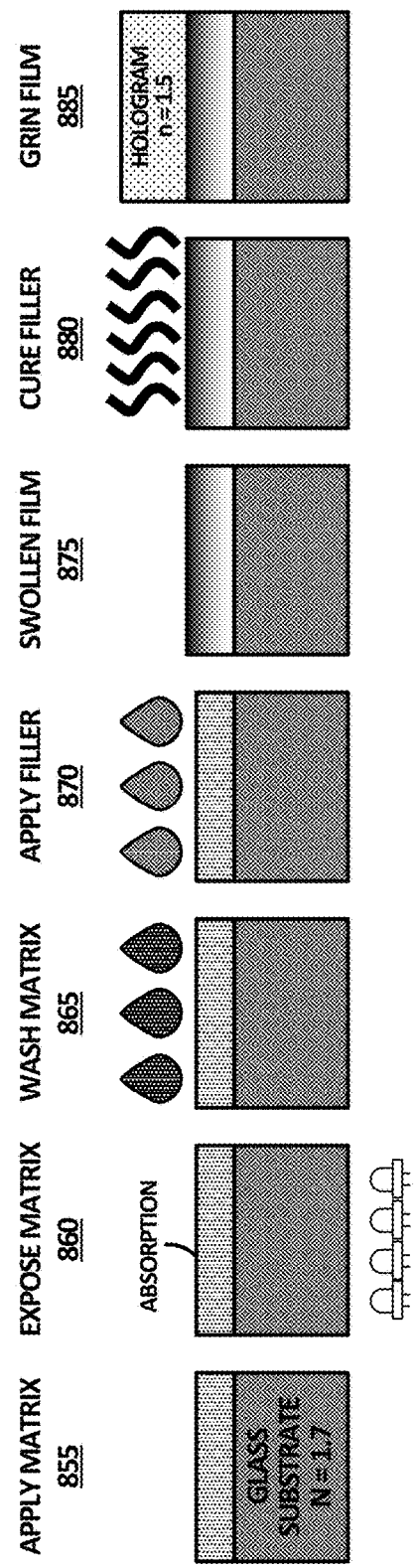
FIG. 8A
FIG. 8B

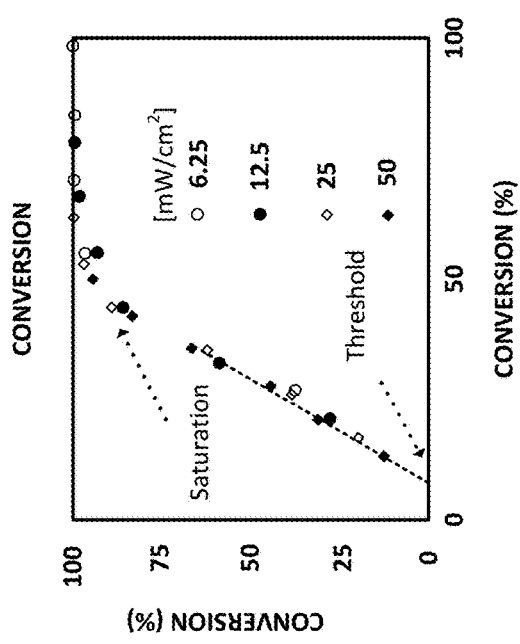
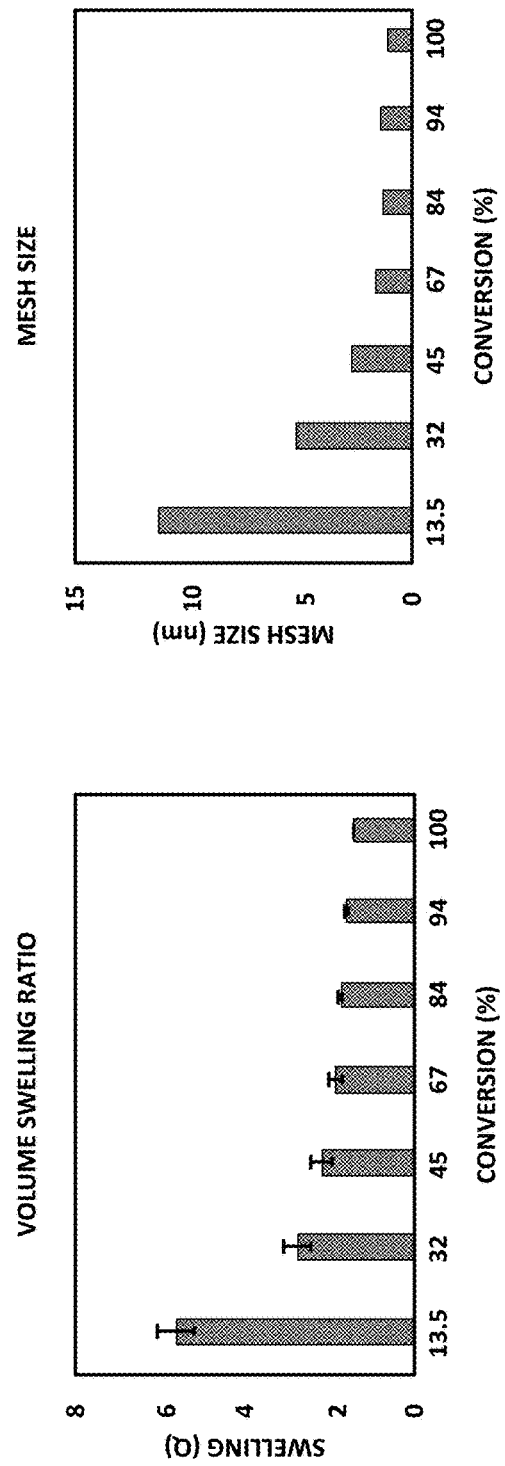
FIG. 9A
FIG. 9B
FIG. 9C

ELASTOMERIC REFLECTION SUPPRESSOR

CROSS-REFERENCE TO RELATED APPLICATIONS

This application claims priority to U.S. Provisional Application Ser. No. 62/731,422 filed Sep. 14, 2018, which is incorporated herein by reference in its entirety for all purposes.

STATEMENT REGARDING FEDERALLY SPONSORED RESEARCH

This invention was made with government support under grant number DE-ACO4-94AL85000 awarded by the U.S. Department of Energy. The government has certain rights in the invention.

TECHNICAL FIELD

Various embodiments of the present technology generally relate to reflection suppressors. More specifically, some embodiments relate to elastomeric reflection suppressors.

BACKGROUND

Optical reflections occur at a surface when the refractive index on the two sides of the surface differs. These are referred to as Fresnel reflections and have typical values of 4% for an air/glass boundary. Optics, including eyeglasses, may be coated in dielectric multi-layer films to reduce these reflections. These coatings are not practical in many manufacturing environments due to cost and complexity.

Often when using light to manufacture an element on a dielectric substrate, e.g. in photolithography or holography, reflections are deleterious, showing up as unwanted recordings of the reflected light. A common strategy is to use an index-matched oil between two solid surfaces, greatly reducing the Fresnel reflections caused by the air gap between them. This oil is messy, can penetrate parts and provides no way to suppress reflections between two materials with differing indices.

A related need in manufacturing is not only to suppress reflections, but also to prevent light from returning once it has exited an optical element. For example, light directed onto a photosensitive material coated on glass would be subject to reflections of that light from the back glass surface. In this case, one desires to not only suppress the backside glass/air reflection but also any other subsequent reflections that would direct light back to the film. Thus, there is need for a simple method to suppress reflections and absorb the transmitted and unwanted light.

SUMMARY

Systems and methods are described for elastomeric reflection suppressors using elastomeric materials doped with optical absorbers. The elastomeric reflection suppressors can provide for the temporary suppression of Fresnel reflections for multiple substrates spanning wide spectral and angular bandwidth. The refractive index of the elastomer can be tuned to match a substrate and minimize reflection. The addition of different absorptive dopants used in various embodiments can allow for either broadband or wavelength-selective reflection suppression. As performance is limited only by index mismatch, both spectral and angular performance significantly exceed that of standard anti-reflection coatings. After use, these light traps may be removed and reused without damaging or contaminating the substrate.

Various embodiments of the present technology provide for removable and reusable, light trap elastomeric films. In some embodiments, a photosensitive material can be deposited onto a substrate having an index of refraction. An elastomer can be formulated, selected, or designed with a refractive index that matches the refractive index of the substrate to suppress Fresnel reflections at a surface of the substrate. The elastomer can be flexible in some embodiments allowing the elastomer to conform to a smooth surface. An absorptive dopant can be incorporated into the elastomer to absorb specific wavelengths across an optical spectrum. In some embodiments, the absorptive dopant can include nanoparticles, dye, colored dye, broadband absorption dopant pigments, titanium dioxide, carbon black, chromophores, photochromic materials, and/or the like. In some embodiments, a dopant with varying concentration can be incorporated through a thickness of the elastomer. In some embodiments, a conductor into the elastomer causing the elastomer to become electrically conductive. The elastomer may be heated, via Joule heating, in one or more embodiments.

The elastomer can be laminated to the substrate. Using a recording light, properties of the photosensitive material can be modified and a portion of the recording light not absorbed by the photosensitive material is absorbed into the elastomer. Upon completion of the recording into the photosensitive material, the elastomer can be removed (e.g., peeled) from the substrate. In some embodiments, a dopant with refractive index substantially different from the elastomer can also be incorporated. For example, the dopant can be a monomer. Some embodiments can monitor a conversion of the monomer into a polymer using real time Fourier Transform Infrared Spectroscopy. A master curve can be used in some embodiments to precisely predict conversion as a function of exposure conditions.

Some embodiments provide for a method of film fabrication. In some embodiments, two or more polymers can be blended to create a polymeric layer to minimize optical reflections between a substrate and the polymeric layer. An absorbing filler (e.g., a colored dye or broadband absorption dopant) can be incorporated into the polymeric layer. A polymeric layer can be deposited onto a carrier or mold and processed. The polymeric layer can be removed from the carrier or mold. In some embodiments, the absorbing filler can include a dopant (e.g., nanoparticle or monomer) with refractive index substantially different from the polymeric layer. In some embodiments, the polymeric layer can include a varying concentration of at least one polymer through the thickness. The polymeric layer and substrate can be processed to minimize optical reflection from a subsequently applied second substrate on the exposed surface of the polymeric layer.

In some embodiments, a gradient refractive index anti-reflective film can be fabricated. The gradient refractive index anti-reflective film can have a first substrate and a second substrate. A gradient refractive index anti-reflective film can be positioned between the first substrate and the second substrate. The gradient refractive index anti-reflective film can have a varying refractive index graded from a first refractive index to a second refractive index to allow light to pass from the first substrate to the second substrate with reduced reflections.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIGS. 8A-8B illustrate two processes for fabrication of gradient index polymer antireflection layers that may be used in accordance with various embodiments of the present technology.

FIGS. 9A-9C illustrates calibration of monomer conversion during photopolymerization to control swelling that may be used in some embodiments of the present technology.

Figure 1:
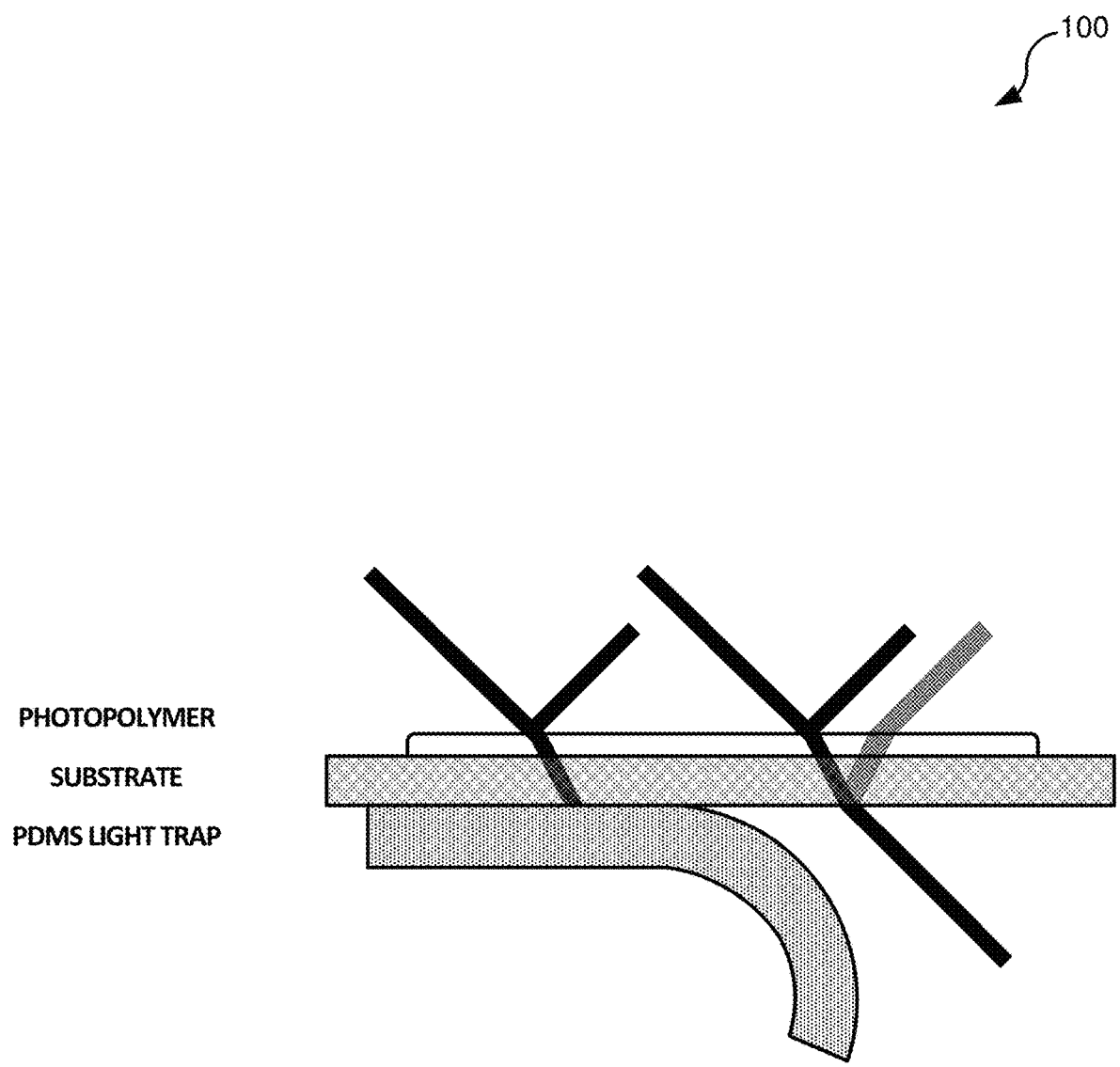
FIG. 1 illustrates substrate reflections with and without a light absorber laminated to backside in accordance with various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to reflection suppressors. More specifically, some embodiments relate to elastomeric reflection suppressors. Suppression of stray light is critical for precision optical systems including: metrology (e.g. ellipsometry), recording (e.g. photolithography and holography) and microscopy (e.g. confocal reflectometry and profilometry). Fresnel reflections, which inevitably occur at the back of transparent substrates, are the most common source of stray light. Such reflections are particularly deleterious when using coherent illumination.

For example, in holography, backside reflections interfere coherently with the incident beams, producing parasitic holograms. A reflected power of only 4% interfering with an incident beam, will record an unintended grating with a fringe visibility of 0.38. In photolithography, reflections back into photoresist leave standing wave patterns along the developed resist, reducing the image contrast. When a transparent substrate is thick enough, these backside reflections produce ghost images within the resist. In optical metrology, stray light reduces signal to noise. Spectroscopic ellipsometry is particularly challenging because reflections are measured for wavelengths spanning ultra-violet (UV) to infrared (IR), and at large angles of incidence. No traditional anti-reflection (AR) coatings span such a large spectral and angular range. AR coatings are costly when each experiment consumes a new substrate, only suppress reflections over only a narrow angular and spectral bandwidth, and require a subsequent beam dump to ensure transmitted light does not return.

Alternatives to AR coatings have been developed. For example, the holographic community has submerged holograms in a tank of index matched fluid (e.g. xylene), and has applied index matching oil between the hologram substrate and an absorptive glass filter. Large open tanks of xylene pose a safety hazard, and index matching fluids can contaminate organic films such as photoresist or polymer. Lithographers use absorptive materials between the photoresist and substrate, known as bottom antireflection coatings, however this adds additional deposition and etch steps to the process. The ellipsometry community typically employs solutions such as: roughing the surface with sandpaper or the application of marker, glue, or tape. These traditional techniques have uncontrolled performance and leave the substrate damaged or contaminated.

Some traditional methods create a gradient by blending two materials (one of which may be air) using either sub-wavelength structure or diffusion. The former can be expensive to fabricate at large scale and delicate to handle. Conversely diffusion provides large area solid mixtures but enables only a single family of gradient profiles controlled by the diffusion time. For micron-thick polymers with diffusivity on the order of 1 µm² second, control of this process would be impractical. The precisely controlled, sub-micron gradient index response of holographic photopolymers suggest that a gradient refractive index (GRIN)

anti-reflection coating (AR) could be created using these techniques, including the low cost and large areas of such films.

In contrast, various embodiments of the present technology incorporate an absorber into an elastomer and laminate over a transparent substrate so that backside Fresnel reflections are suppressed. Reflected intensity is limited only by the index contrast between substrate and elastomer. Using carbon black as an absorber, and a PDMS elastomer, various embodiments have demonstrated a 15 dB or higher reduction of back reflections on glass over a 600 nm bandwidth. As the elastomer is removable, there is no damage or residue left behind on the substrate after use.

Various embodiments of the present technology utilize an elastomer that can conform to sufficiently smooth surfaces, even if those surfaces have curvature, replacing the commonly used oil. The refractive index of the elastomer can be tuned to match that of the surface, strongly suppressing reflections. When removed, the elastomer leaves no residue. The elastomer, being a solid, can also support dopants or smooth changes of properties (e.g. refractive index), extending what can currently be accomplished with oils.

Some embodiments also provide fabrication methods for and performance of gradient index polymer antireflection layers that can suppress Fresnel reflections between two materials with differing refractive index by providing a smooth transition of refractive index between the two dissimilar materials. These techniques can produce a thin polymer coating which reduces reflections between dissimilar solid substrates over a broad specular and angular bandwidth. Some embodiments relate to a custom polymer film whose refractive index smoothly varies between that of a high index glass substrate and the lower index holographic photopolymer. This film will consist of two polymers with contrasting refractive index whose relative volume fraction varies in depth. This coating is expected to be low cost and well suited to volume manufacturing.

Some embodiments provide for various processes for creating gradient index (GRIN) AR films. In some embodiments, a uniform conversion of a matrix film can be swollen with filler followed by gradient photopolymerization of that filler. In other embodiments, a gradient photopolymerization of a matrix film can be used to control gradient swelling and subsequent uniform polymerization of filler. Spatially uniform polymerization can be designed as a catalytically- or thermally-initiated process for maximum homogeneity, but photoinitiation at long wavelength is also possible. Gradient conversion can be spatially controlled through Beer-Lambert absorption. Standard UV absorbers such as Tinuvin enable ~10 micron absorption depth when illuminated at 365 nm, but various embodiments can use shorter wavelengths to deterministically compress the gradient distance to optimize control of reflectivity. It is expected that films as thin as 2 microns will have good AR performance—these will likely require illumination with LEDs at 340 nm or below.

Applications of the elastomeric reflection suppressors include ellipsometry, hologram recording, holographic/diffractive optical elements, lithography, augmented reality components, three-dimensional printing, and others.

Various embodiments of the present technology provide for a wide range of technical effects, advantages, and/or improvements. For example, various embodiments include one or more of the following technical effects, advantages, and/or improvements: 1) films for suppressing unwanted reflections into a photosensitive material such as photographic or holographic film during optical exposure; 2) films for suppressing unwanted reflections during optical measurements such as spectroscopy or ellipsometry; 3) films for suppressing unwanted reflections in an optical instrument such as a camera or display system including augmented and virtual reality displays; 4) films for suppressing unwanted reflections in light-based 3D printing such as scanning-laser or digital projection stereolithography 5) incorporation of the structured dopants into the elastomeric body of photosensitive recording media such as photographic or holographic film in order to suppress reflections from the boundaries of such films and adjacent substrates and/or modify the spatial recording properties of such films due to the presence of said dopants; and/or 6) lamination of an elastomeric film (possibly held on a carrier, mold or other substrate) onto a substrate in order to minimize optical reflections between that substrate, the elastomer, and possibly a subsequently applied second substrate on the exposed surface of the elastomer.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1. illustrates an elastomeric light trap laminated against a transparent substrate. In regions where the substrate is in contact with the light trap, backside Fresnel reflections are effectively suppressed. In contrast, without contact to the light trap, back reflected light propagates through the photopolymer. As illustrated, the light trap may be peeled off leaving a clean, unaltered substrate surface.

As shown in FIG. 1, various embodiments of the light trap elastomeric films can adhere to smooth surfaces, can be removed by peeling, and are reusable. Once removed, the original substrate is left clean and undamaged. These light trap films are index tunable to match different substrates. Not only does this dramatically reduce the magnitude of reflections, but also increases the critical angle for total internal reflection. As a result, reflection suppression is improved over a much larger spectral and angular bandwidth than is possible with AR coatings. Various embodiments have demonstrated index tuned light traps that suppress reflections by over 30 dB for wavelengths spanning ultraviolet (UV) to infrared (IR) over a broad angular range.

By incorporating absorptive dopants, in addition to suppressing reflections, these films serve as a beam dump. Wavelength dependent absorption may be tailored by incorporating different dopants in some embodiments. Both broadband and wavelength-selective absorption have been demonstrated.

Applications sensitive to backside reflection include ellipsometry, and holography. Spectroscopic ellipsometry relies on polarization measurements taken over a broad wavelength range. Backside reflections are problematic when making ellipsometric measurements, especially on thin transparent substrates, and a number of techniques have been suggested for overcoming this. These techniques have included black electrical tape, marker, glue, and sandpaper. All of these either leave behind residue or damage to the original substrate. Furthermore, many of these techniques primarily work by producing a diffuse rather than specular reflection, and therefore do not eliminate all stray light.

In contrast various embodiments of the present films are dry. This eliminates the need for index matching oil or fluids, and allows holding the substrate in any orientation with no mess or concerns about film contamination. In addition, some embodiments of these films peel away from the substrate surface without damage, leaving the surface clean. Also, the integration of anti-reflection and optical absorption functions simplifies optical system design.

To allow for simple fabrication, various embodiments can use off-the-shelf materials for these light traps. For example, some embodiments can use both poly(dimethylsiloxane) (PDMS) and a polyurethane as base matrices. PDMS is readily available as a two component system, with a refractive index close to many lower index glasses. Polyurethane has a larger refractive index that is easily tuned by incorporating a second stage photopolymer into the polyurethane matrix. Index tuning for polyurethane was demonstrated over a range appropriate for common optical substrates. For applications requiring broadband absorption, various embodiments incorporate carbon black as an absorber, while for applications requiring wavelength selective absorption some embodiments can incorporate a UV absorber, Tinuvin.

Holograms, written with coherent illumination, are especially sensitive to stray light during recording: a reflection as small as 4% will produce interference patterns with fringe visibility of 0.38. Typical hologram production involves exposing a photopolymer laminated onto glass. Reflections from the glass-air interface introduce spurious gratings, with large enough visibility to degrade hologram fidelity. A technique used by holographers is to index match the glass substrate with an absorptive neutral density (ND) filter via a thin layer of liquid, usually index matching oil. This method does effectively suppress reflections and stray light. However, use of index matching oil complicates sample holding and requires extensive clean up.

An index matched, soft elastomer that incorporates a broadband absorber according to various embodiments, can effectively suppress reflection without any of the above-mentioned issues. The choice of absorber is influenced by materials used in stray light control. Carbon black is a convenient non-bleachable broadband absorber, readily incorporated into PDMS. Including small quantities of carbon black with PDMS, creates an effective absorber with minimal scatter. Adhesion between a soft elastomer and glass provides sufficient hold while still allowing the layer to be peeled off, leaving the surface clean.

In some embodiments, light traps can be fabricated from PDMS (e.g., Dow Corning, Sylgard 184), and carbon black (e.g., Cabot, VXC72R). A mold can be made of two glass plates treated with Rain-X and separated by an acrylic spacer. Sylgard 184 is first mixed 10:1, and then 0.5 wt % carbon black mixed in. The polymer/carbon matrix can be degassed under vacuum, and cast between two glass plates. The Sylgard is cured at 65° C. for six hours. Alternatively, the mixed and degassed PDMS/carbon black may be cast on a roll-to-roll process forming a continuous film.

Figure 2:
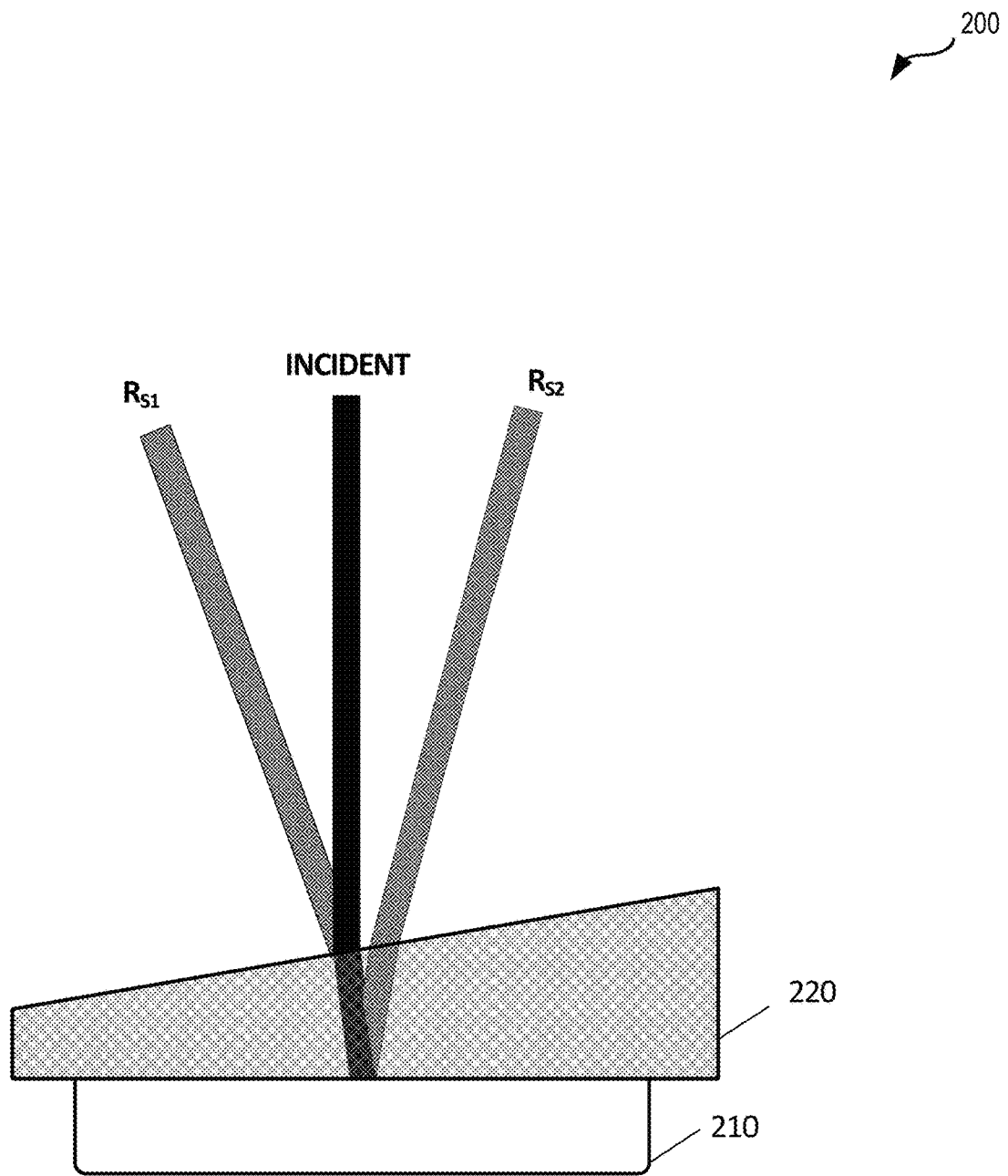
FIG. 2 illustrates light traps that were laminated onto a wedge prism used to separate first and second surface reflections.

FIG. 2 illustrates light traps that were laminated onto a wedge prism used to separate first and second surface reflections. As illustrated in FIG. 2, to measure reflection suppression, the light traps 210 can be laminated onto a wedge prism 220 to separate first and second surface reflections. The prism can be an uncoated BK7 wedge (Melles Griot, 4° deviation). Samples were illuminated with a deuterium/halogen lamp (Ocean Optics DH-2000-BAL). Reflectance measurements were made with a VIS/NIR spectrometer (Ocean Optics Flame-S-VIS-NIR).

The measured complex refractive index of the light trap was n=1.42−0.08 i at λ=633 nm. Given this and the refractive index of BK7, n=1.52, the expected Fresnel reflections against air and PDMS were calculated. For glass-air, the calculated reflected intensity is 4.26%, while for glass-light trap reflected intensity is 0.116%. Therefore, a 15.6 dB reduction in reflected light would be expected. Comparing this to the measured reduction, 14.9 dB at λ=633 nm, demonstrates that the light trap works as anticipated. Across all wavelengths from λ=350 nm to λ=950 nm, total reflected intensity is reduced by 15.0 dB±0.3 dB.

Tested Films

Some embodiments of the PDMS light traps were be prepared by mixing Sylgard 184 in a standard 10:1 weight ratio. An absorber consisting of carbon black at 0.5 w.t. % or Tinuvin 328 at 0.2 w.t. % is mixed into the resin at room temperature. The final mixture can be degassed under vacuum until no bubbles are visible. To make a film, the PDMS can be cast between glass plates, coated in RainX, separated by a 1 mm rubber gasket. Finally, PDMS films can be cured at 65° C. overnight, then peeled from the glass plates and laminated onto the wedge prisms.

Polyurethane light traps can be prepared by mixing Polycaprolactone-block-polytetrahydrofuran-block-polycaprolactone polyol (Sigma) and Desmodur N3900 (Covestro AG) in a stoichiometric ratio (OH:NCO=1:1). To tune the refractive index, two-stage formulations were prepared using a high refractive index acrylate monomer, 2,4,6-tribromophenyl acrylate (TBPA), and a photoinitiator, diphenyl(2,4,6-trimethylbenzoyl) phosphine (TPO). 30 w.t. % TBPA can be chosen in some embodiments to achieve a final cured index of 1.51. TPO can be mixed in at 1 mol %, and absorber is mixed in while heating the mixture to 70° C. The final mixture can be degassed under vacuum and cast a between glass plates, coated in RainX, separated by a 1 mm rubber gasket. Finally, polyurethane films can be cured at 70° C. overnight. Before removing the film from the glass, index tuned polyurethanes can be exposed under an LED diode bar (405 nm) for 10 minutes on each side.

For each exemplary film, refractive index was measured with a Metricon prism coupler at the following wavelengths: 405 nm, 525 nm, 637 nm, 984 nm, 1546 nm. To measure reflectance, elastomers were laminated onto the bottom of wedge prisms and illuminated with collimated laser light. The incident power, first surface reflected power, and second surface reflected power were measured using silicon detectors. Lasers used include the following wavelengths: 364 nm, 405 nm, 473 nm, 532 nm, 633 nm, 830 nm; each collimated to approximately a 1 mm beam diameter. Incident and first surface reflected photocurrent was measured with a Newport power meter. Second surface photocurrent was measured with a lock-in amplifier and optical chopper (Stanford Research Systems SR830, SR540).

This selection of base elastomer materials was driven by both a need for readily available commercial materials, as well as refractive indices of common optical materials, which typically fall between 1.45 and 1.7. The first condition ensures wide accessibility of the technique. The second condition ensures an index match that is close enough to significantly suppress reflections.

Figure 3:
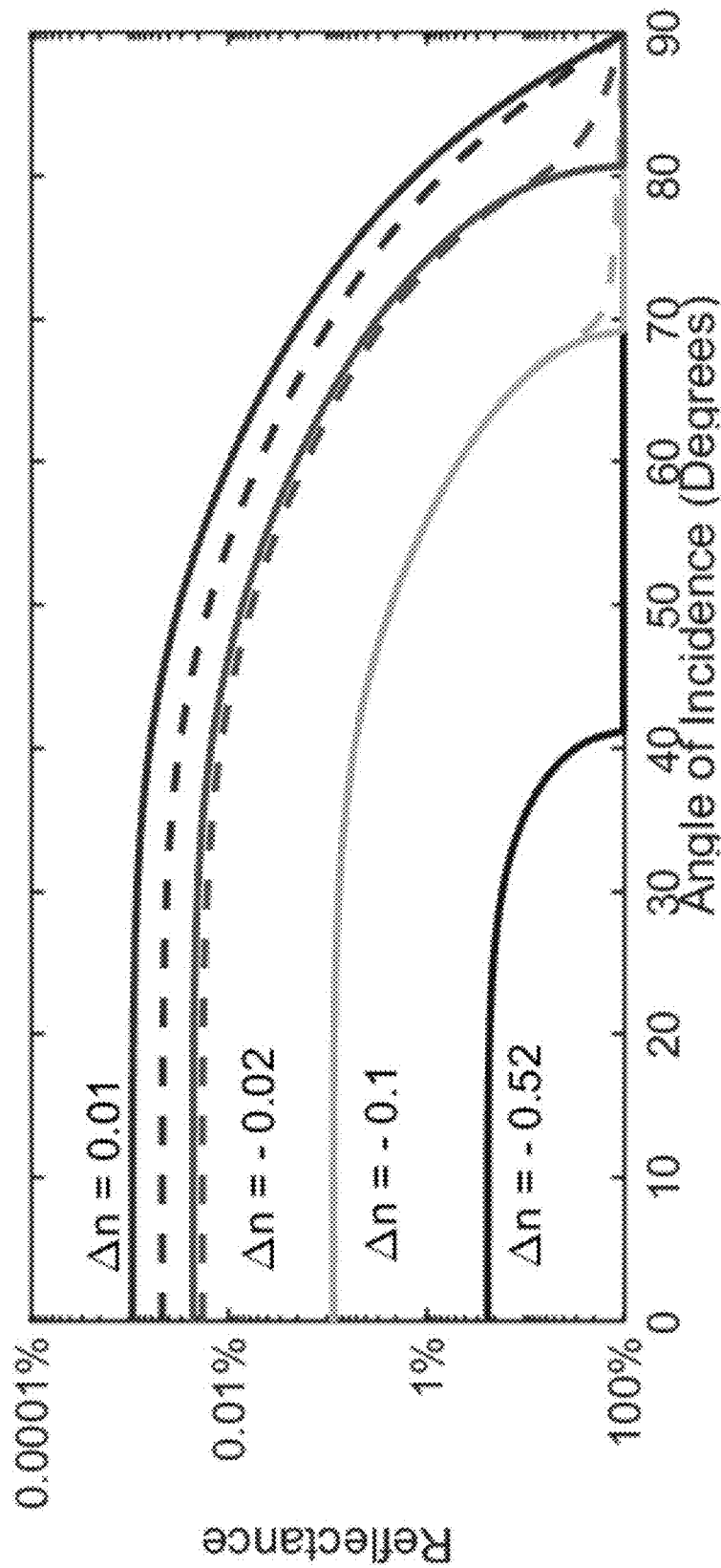
FIG. 3 is a plot of the reflectance as a function of angle of incidence and index mismatch for substrate n=1.52 and where the solid lines represent a real index, while dashed lines represent a complex index with extinction coefficient κ=0.01.

Fresnel reflections depend on refractive index mismatch, angle of incidence, and polarization. FIG. 3 is a plot angular reflectance of unpolarized light at the interface of a glass substrate (n=1.52) backed with different dielectric media. Starting with a refractive index lower than that of the substrate (Δn<0), reflections decrease as Δn decreases in magnitude, while the critical angle for total internal reflection shifts to larger angles of incidence. As refractive index is increased beyond that of the substrate (Δn>0), TIR is eliminated, maximizing angular performance.

At the elastomer/substrate interface, reflection suppression will be dominated by the mismatch of the real parts of the refractive indices. Fresnel reflections from the back of the elastomer must then be suppressed by round-trip absorption in the film. The expected attenuation, in dB, due to round-trip absorption in a film of thickness t can be calculated as $$\text{Attenuation} = 109 \frac{\kappa t}{\lambda}. \quad (1)$$

In these examples, the thickness and absorption are chosen to be sufficiently large that reflectance is dominated by the Fresnel reflection at the material interface.

Two different types of absorption spectra are possible. Broadband spectral absorption is needed in most situations such as optical metrology over a wide spectrum. However, spectrally selective absorption can enable more sophisticated use, for example optical recording and reflection suppression in one wavelength monitored at a second wavelength where the elastomer is transparent. To demonstrate both abilities, we used two absorptive dopants.

For broadband absorption, various embodiments can incorporate carbon black. Carbon black is an excellent material for broadband light absorption, and is commonly used in stray light reduction. With strong absorption from UV to IR, carbon black is ideal for applications such as spectroscopic ellipsometry. To minimize scattered light a minimal quantity of carbon black was mixed into each elastomer. For the second case, wavelength-specific absorption, we used Tinuvin 328. Tinuvin 328 is a UV absorber, and passes visible light. To satisfy different application requirements, there are many other possible additives with various absorption spectra.

To maximize performance, the refractive index of polyurethane can be tuned through the addition of high refractive index monomer (TBPA) and photoinitiator (TPO) to the polyurethane. Photopolymerizing this monomer after thermal cure of the polyurethane raises the bulk refractive index as a function of monomer weight loading. For each elastomer formulation, refractive index measurements were made using a prism coupler for five different wavelengths. These measured values were fit to the Cauchy equation, and are summarized in Table 1.

| Elastomer | Real Index (λ in nm) |
|---|---|
| PDMS | $n(\lambda) = 1.403 + \frac{3486}{\lambda^2} + \frac{7.498E7}{\lambda^4}$ |
| Polyurethane | $n(\lambda) = 1.467 + \frac{3205}{\lambda^2} + \frac{1.475E8}{\lambda^4}$ |
| Index tuned Polyurethane | $n(\lambda) = 1.495 + \frac{5524}{\lambda^2} + \frac{0.5640}{\lambda^4}$ |
| Polyurethane + Tinuvin | $n(\lambda) = 1.465 + \frac{5118}{\lambda^2} + \frac{3.865E7}{\lambda^4}$ |

The measured values of refractive index for PDMS and polyurethane, are nD=1.412 and nD=1.477 respectively. These refractive indices are appropriate for substrates such as fused silica and BK7, consequently both are used in testing. For the index tuned polyurethane, adding 30 wt % TBPA to the base polyurethane increased the measured refractive index to nD=1.507 post photocure].

Figure 4:
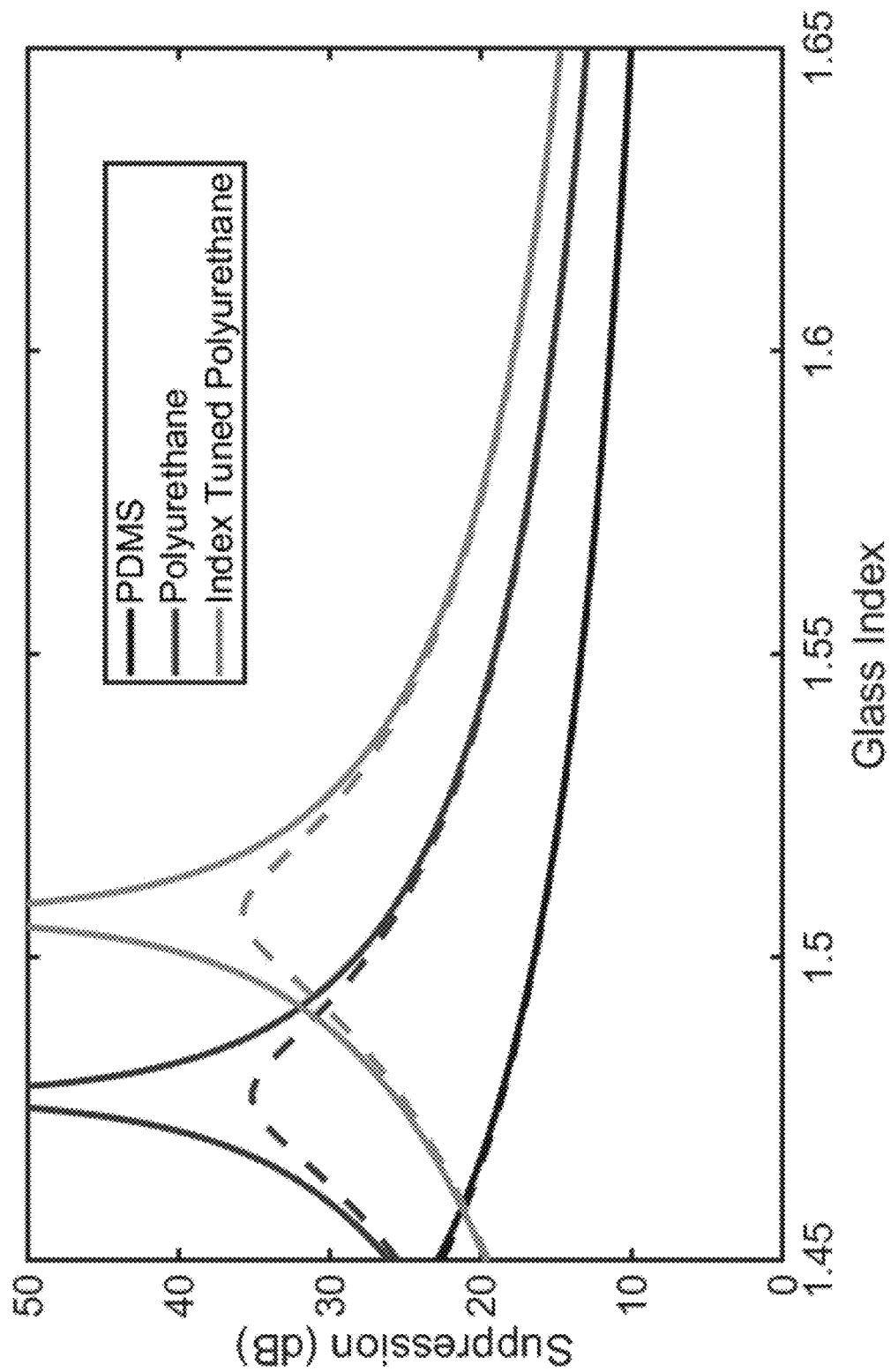
FIG. 4 is a plot of the computed reflection suppression at normal incidence for various elastomer systems against a range refractive index values typical of optical substrates including suppression for both lossless (real valued, solid lines) and lossy (complex valued, dashed lines) elastomer indices.

Considering reflections when the real indices are well matched, the imaginary index component becomes non-negligible. Non-zero K increases reflections due to index mismatch, while eliminating TIR, as shown in FIG. 3. To further elucidate the effect on reflection suppression, plots of normal incidence reflection suppression between substrates and elastomers with real (solid lines) and complex (dashed lines) refractive index are given in FIG. 4.

For κ=0.01, impact on reflection suppression is limited to narrow regions where the real index is well matched. However, even this large K does not significantly limit reflection; it is still possible to achieve reflection suppression in excess of 30 dB. The prism coupler used to measure index is not capable of measuring the imaginary component of refractive index, although it is estimated from the reflectance data given below.

To validate the performance of these light traps, reflectance measurements at the interface between glass and light trap were made by laminating elastomer films onto wedge prisms. A wedge prism geometry allows for first surface and second surface reflections to be separated in angle. With a small wedge angle, the transmitted light impinges on the glass/polymer interface at near normal incidence. Prisms made of BK7 (nD=1.516) and fused silica (nD=1.458) were used as these are representative of commonly encountered optical substrates. For several combinations of polymer/glass, reflection suppressions far exceeded the dynamic range of a typical USB spectrometer. Therefore, measurements utilized six discrete lasers with wavelengths spanning UV to NIR, and Si photodiodes to measure the incident power and reflected power from both prism surfaces. In the case of index-tuned polyurethane, measured photocurrents were small enough to necessitate the use of a lock-in amplifier. Repeat measurements were made across each film, as well as after peeling and replacing the films.

Note that the surface of both the substrate and film are clean before application. The films may be cleaned with methanol and Texwipes between uses to remove particulate that may have accumulated. By rolling elastomer films onto the substrate, an air-free interface can be achieved. Spectroscopic reflectance data taken for the PDMS/BK7 combination showed no spectral fringes. Were there a trapped air film, spectral fringes would be present.

Figure 5:
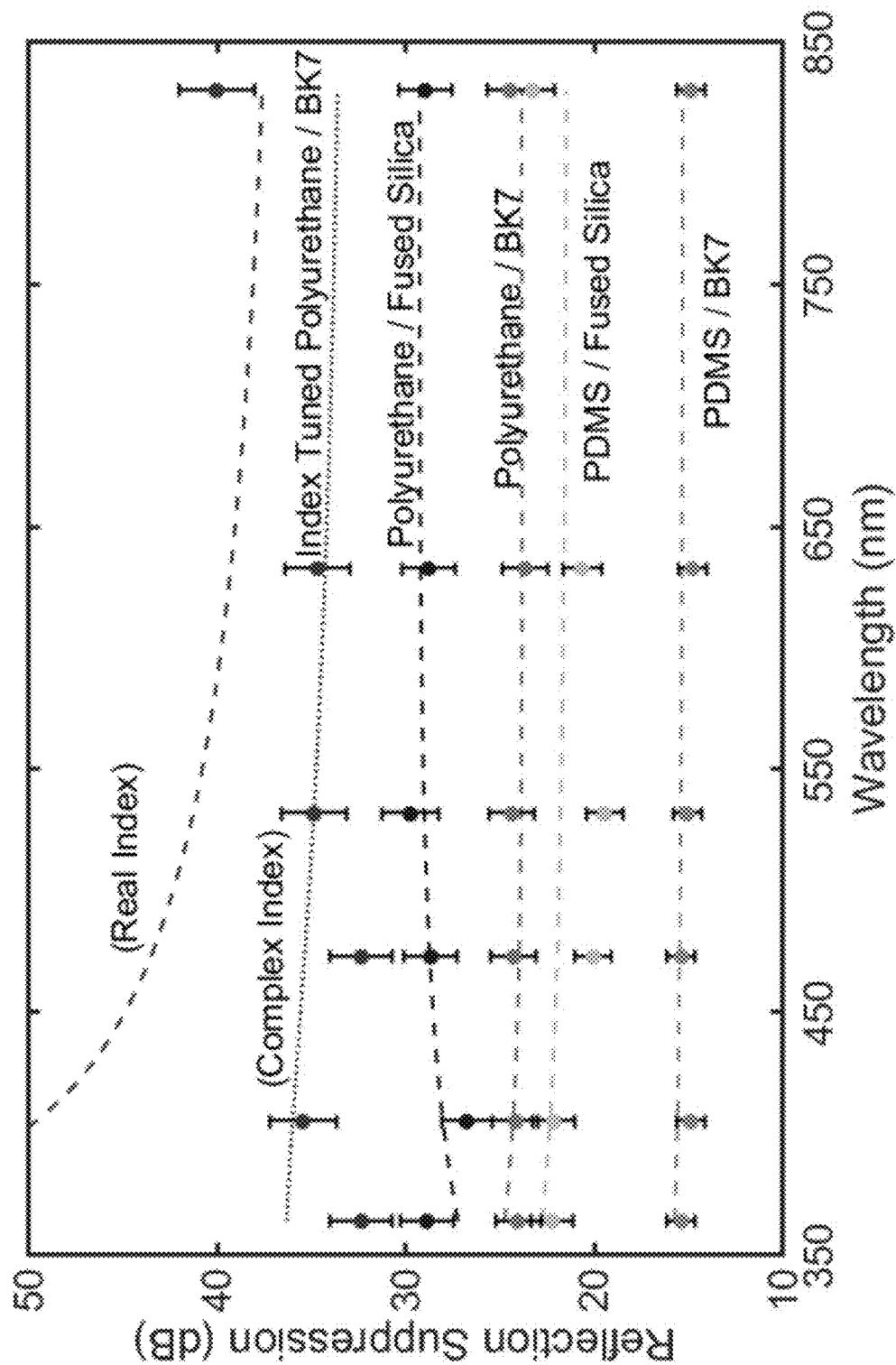
FIG. 5 is a plot of the measured reflection suppression values (O's) along with expected performance (dashed lines) calculated from the measured index values where the error bars represent 1 standard deviation for each measurement.

Reflection suppression of various broadband absorbers on various substrates is shown in FIG. 5. Dashed lines were computed from the Fresnel coefficients using the Cauchy fits from Table 1, assuming κ=0. The agreement between theory and experiment is seen to be good except case of index-tuned polyurethane on BK7. In this case, mismatch of the imaginary index dominates. A fit yields k=0.01 and good agreement with theory (dotted line). Error bars are larger on this experiment due to the low reflected light levels, making it difficult to remove and replace the film with repeatable results. Therefore, for index-tuned films achieving greater than 35 dB reflection suppression, we recommend casting and polymerizing the light trap directly on a clean substrate, then removing the film after use.

Figure 6:
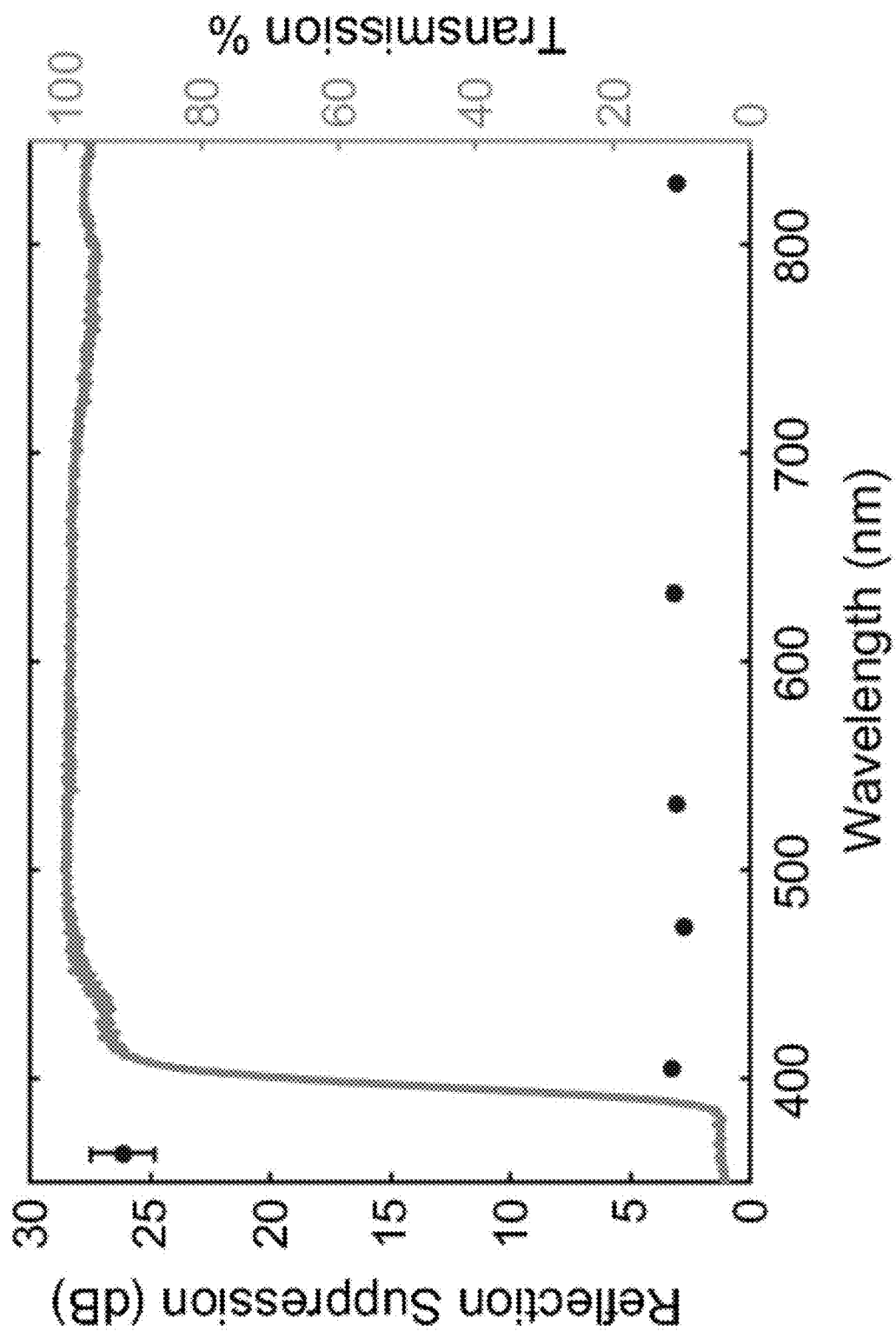
FIG. 6 is a plot of the measured reflection suppression and transmission spectra values for polyurethane doped with a UV selective absorber (Tinuvin 328, 0.2 w.t. %).

To demonstrate wavelength selective reflection suppression, Tinuvin 328, a non-bleachable UV absorber, is added to polyurethane. FIG. 6 shows plots of both reflection and transmission spectra for this film. After incorporating Tinuvin 328, we also found that the refractive index increased slightly to nD=1.479. As expected, a polyurethane film with Tinuvin absorber suppressed UV reflections by a similar amount compared to polyurethane with carbon black. However, visible reflections were only reduced 3 dB. The cause of this reduction was scatter from roughness on the backside of the film. After passing through the light trap, collimated visible beams exhibited no visible scatter. Many other possible additives with different absorption spectra may be used, enabling the method to be customized for a wide range of applications.

Creating Holographic Images

Figure 7:
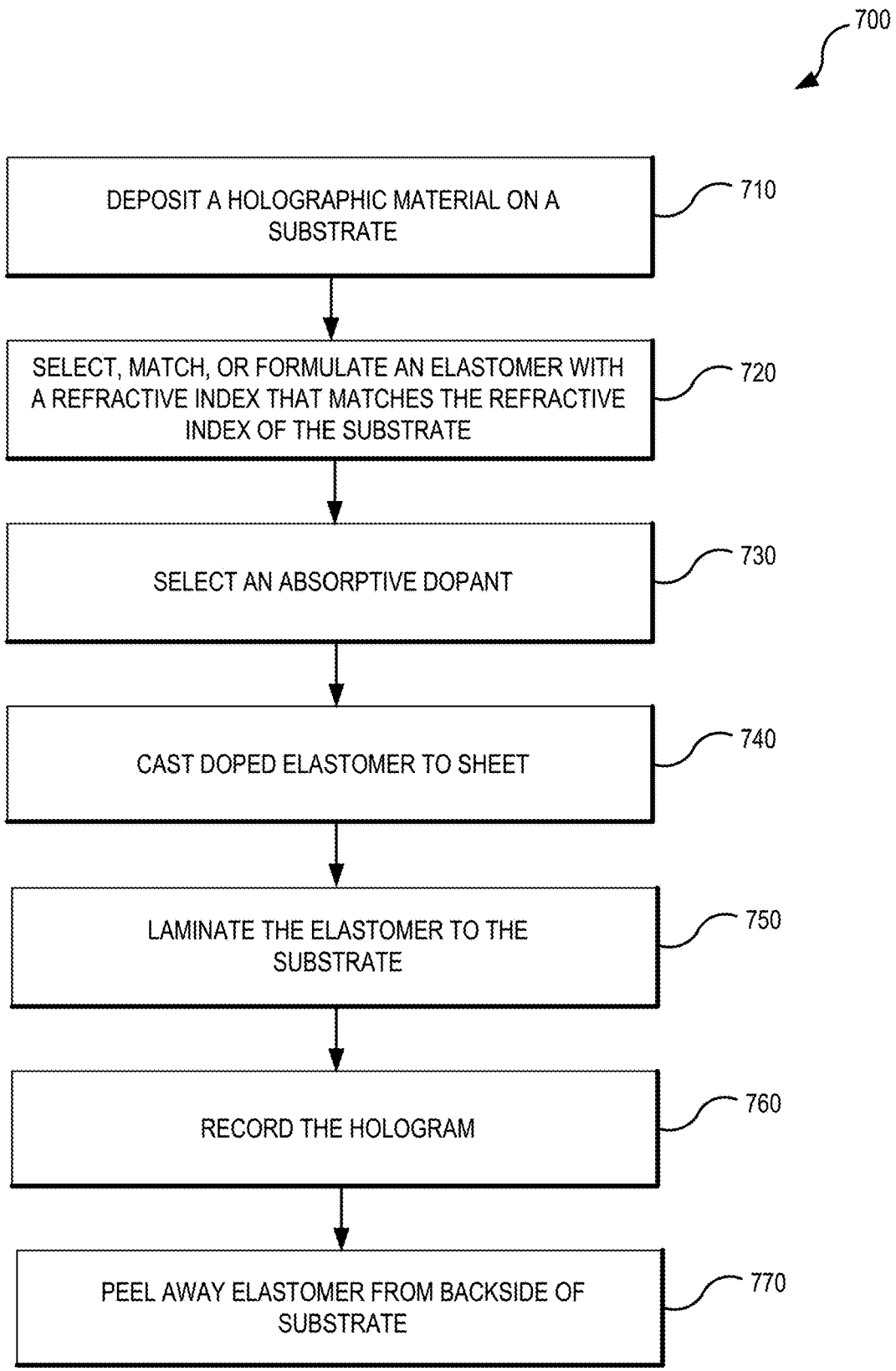
FIG. 7 is a flowchart illustrating method of creating holographic image with a elastomeric reflection suppressor in accordance with some embodiments of the present technology.

FIG. 7 is a flowchart 700 illustrating method of creating holographic image with an elastomeric reflection suppressor. As illustrated in the embodiments shown in FIG. 7, a holographic material can be deposited (710) on a substrate. An elastomer can be selected, matched, or formulated (720) with a refractive index that matches the refractive index of the substrate. Some embodiments provide for an elastomer that is index matched to suppress Fresnel reflections of a surface. An elastomer whose index is closely matched to a desired substrate at a multiplicity of wavelength to enable broad-band operation. The elastomer can be flexible, able to conform to, and make intimate contact, with sufficiently smooth surfaces. An absorption filter can be selected (730). The elastomer can be cast doped (740) to a sheet.

The elastomer can then be laminated (750) to the substrate and a hologram can be recorded (760). By laminating a removable elastomeric material onto a dielectric to suppress backside reflections the typical problems (e.g., leaving residue, leaking or penetrating the surface) with liquids used for this purpose are eliminated. The elastomer may be loaded with various dopants to modify function, e.g. carbon black or dye. This then may be tuned to absorb at specific wavelengths. The elastomer may be structured, for example, with a change of refractive index through thickness to suppress reflections between two materials of dissimilar refractive index. The elastomer may contain enough carbon filler that it becomes electrically conductive. This allows the elastomer to act as a heating element via Joule heating or suppress static electricity. Once the recording is complete, the elastomer can be removed (770) (e.g., peel away) from the backside of the substrate.

FIGS. 8A-8B illustrates two processes for fabrication of gradient index polymer antireflection layers for holographic optical elements. In the embodiments illustrated in FIG. 8A, a matrix can be applied (805) to a substrate. The matrix can be cured (810) and a filler can be applied (815). Then, a uniformly polymerized matrix film can be swollen (820) uniformly with a filler which is then photopolymerized (825) only near the substrate via strong Beer-Lambert absorption. The filler can be washed (830) and a GRIN film applied.

In the embodiments illustrated in FIG. 8B, a matrix can be applied (855) to a substrate. Absorption can be used to polymerize the matrix fully only near the substrate such than the filler swells preferentially into the top of the film and is then thermally cured (860) in place. The illumination can be from the top or bottom in either process, reversing the direction of the gradient. The matrix can be washed (865) and a filler can be applied (870) to swell (875) the film. The filler can then be cured (880) and a GRIN film can be applied (885).

In some embodiments, strong Beer-Lambert absorption of a UV light source can be used to create an exponentially decaying exposure dose in depth which in turns initiates photopolymerization with an exponential conversion. Wet post processing such as swelling in or washing out a contrasting monomer can be used to create a binary mixture with a depth-dependent concentration ratio. Given the similarity of this process to holographic photopolymers, some embodiments may create a separate film and the fabrication of this AR layer directly in the surface of the holographic photopolymer itself.

Various embodiments of the present technology use precisely-calibrated photopolymerization processes to control compositional gradients of two dissimilar polymers. Some embodiments can create films which continuously vary the compositional fraction between high and low index polymers. Rather than microstructured surface patterning, which is expensive and delicate, or precisely timed diffusion, which cannot be controlled on this scale, this embodiment programs the composition through photopolymerization. The polymerization and swelling processes are first characterized and calibrated in large, bulk samples so that composition can be precisely controlled by optical exposure dose. To create the gradient films, some embodiments can then use Beer-Lambert absorption of UV light (which can be very precisely calibrated) to expose the film with variable dose through the depth of the film. The performance of the gradient index film can then be tested via optical reflectometry.

FIGS. 9A-9C illustrate calibration of monomer conversion during photopolymerization to control swelling in accordance with various embodiments of the present technology. As illustrated in FIG. 9A, real time Fourier Transform Infrared Spectroscopy (FTIR) can be used to monitor the conversion of monomer into polymer under different illumination intensities. As is typical for radically-initiated photopolymers, this conversion is not a linear function of intensity but can be mapped onto a master curve that allows precise prediction of the extent of conversion as a function of exposure conditions. In parallel, various embodiments can quantify how this partially converted polymer swells in a second, filler material.

As shown in FIG. 9B, the swelling depends strongly on conversion, enabling local control of the mixture of the original matrix polymer and subsequently applied filler. FIG. 9C shows that the typical size of the polymer mesh can be calculated from this data, enabling monomer dimensions to be chosen that will penetrate some regions of the matrix and be completely excluded from others. These two parameters influence transport of the filler into the matrix as is quantified by mesh size.

In summary, by locally controlling intensity and time of exposure, various embodiments can "program" a matrix polymer to swell by a controllable amount in a subsequently applied filler. By choosing polymers with strongly contrasting refractive index, various embodiments thus can program gradient refractive index with no need for precise timing control or expensive nanofabrication processes.

Figure 10A:
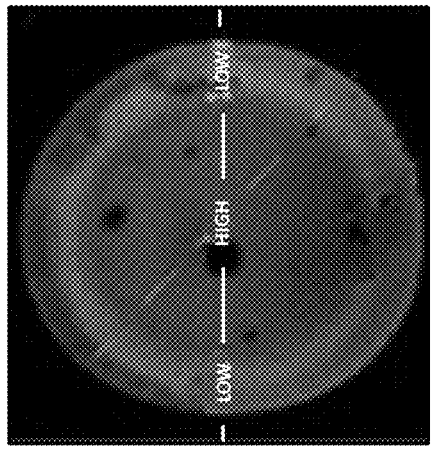
FIGS. 10A-10D illustrates a demonstration of photo patterned composite polymer fabrication quantified by confocal fluorescence microscopy of labeled monomers in accordance with one or more embodiments of the present technology.
Figure 10B:
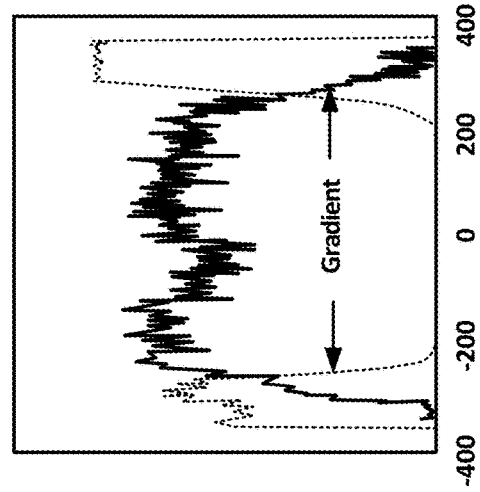
Figure 10C:
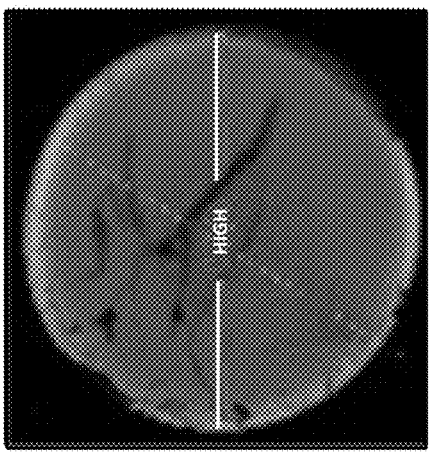
Figure 10D:
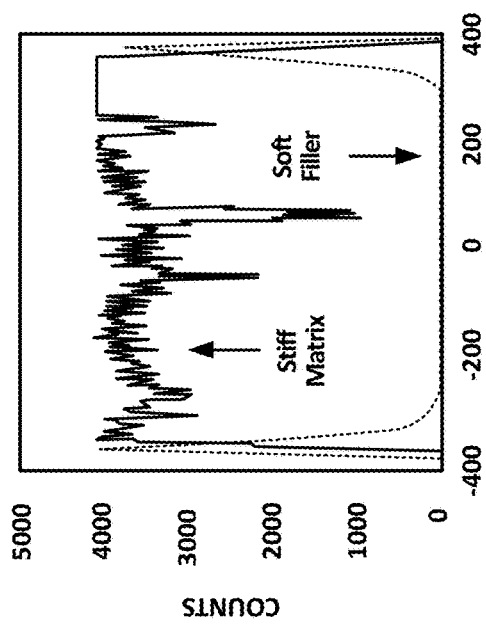

FIGS. 10A-10D illustrates a demonstration of photo patterned composite polymer fabrication quantified by confocal fluorescence microscopy of labeled monomers using two different approaches for creating these gradient properties in accordance with various embodiments of the present technology. In FIGS. 10A-10B, the goal was to 3D print a small (~100 micron) polymer rod from one material, then cast on a second monomer such that the two form a gradient interface region with controlled thickness. FIGS. 10A and 10B illustrate a polymer rod photopolymerized to uniform high conversion then soaked in a second contrasting monomer demonstrating no penetration. FIGS. 10C and 10D show the polymer rod was fabricated with an outer layer of reduced conversion via grayscale image projection such that the mesh size permits swelling by the second monomer, creating a density gradient between the two polymers. Note that in FIG. 10D there is a smooth gradient between the two pure phases over about 100 microns.

Figure 11:
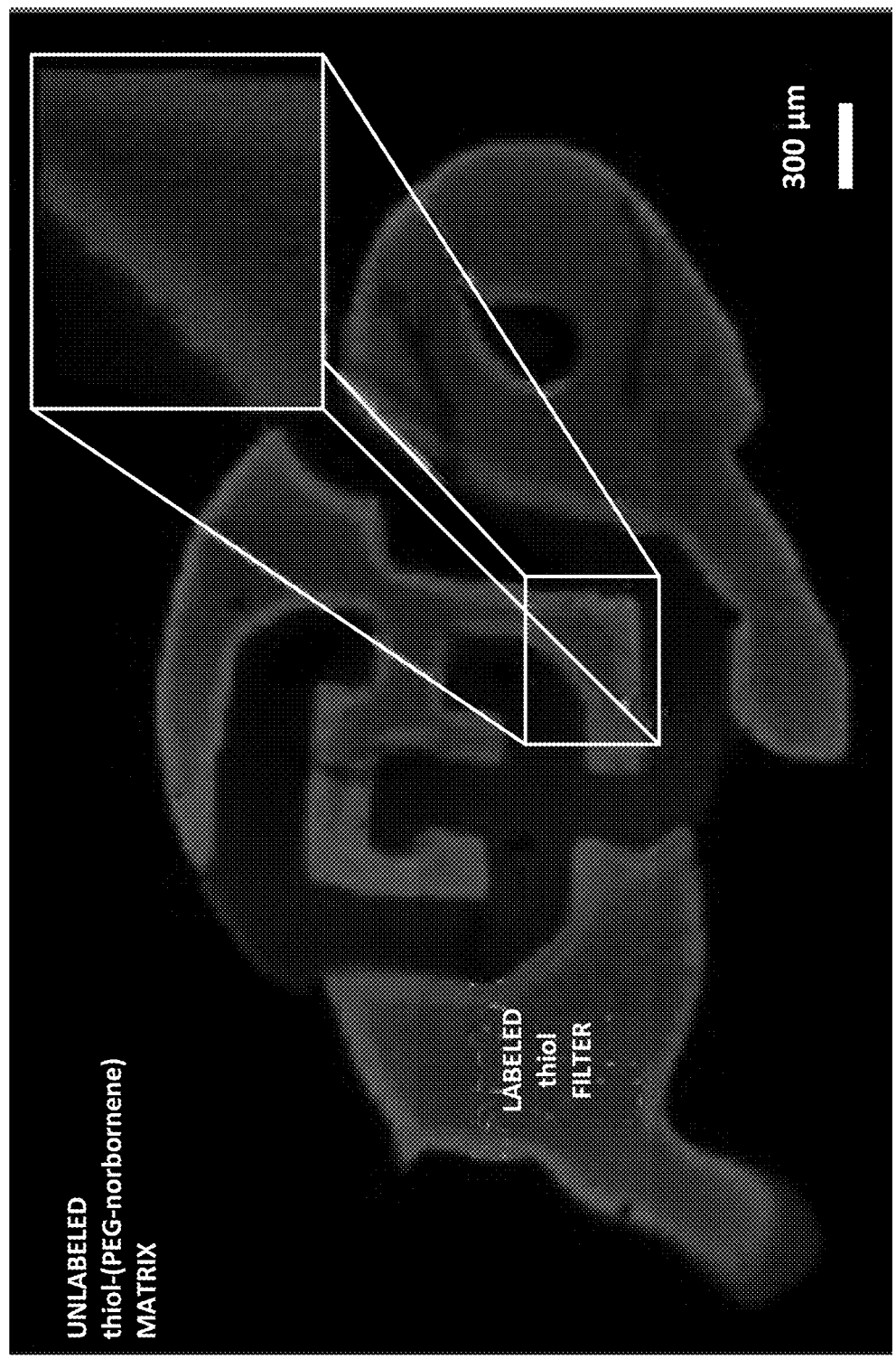
FIG. 11 illustrates an example of an alternative process in which a matrix polymer is swollen with a second monomer which is photopolymerized in place, then washed, in accordance with various embodiments of the present technology.

FIG. 11 shows an alternative approach in which the previous steps were reversed. Here a matrix (with no fluorescent tag, so it appears black) is uniformly polymerized. In the embodiments illustrated in FIG. 11, a filler monomer (tagged with a fluorophore) was uniformly swelled in and then used patterned light in the shape of the CU buffalo to locally attach the filter to the matrix. In summary, these demonstrate that binary composites with gradient properties can be created by various combinations of photopolymerization and swelling of a matrix polymer with a filler. The refractive index of the composite is well approximated by the volume-fraction weighted average of the two constituents, enabling precisely controlled GRIN structures in 3D.

Figure 12A:
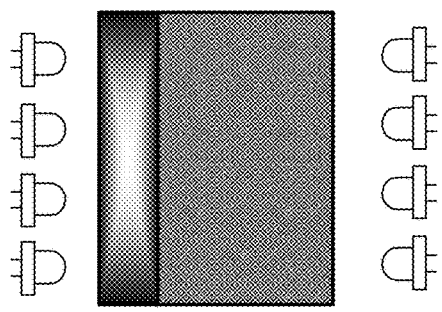
FIGS. 12A-12C show holographic apodization through photopolymerization of a graded polymer structure near surfaces according to some embodiments of the present technology.
Figure 12B:
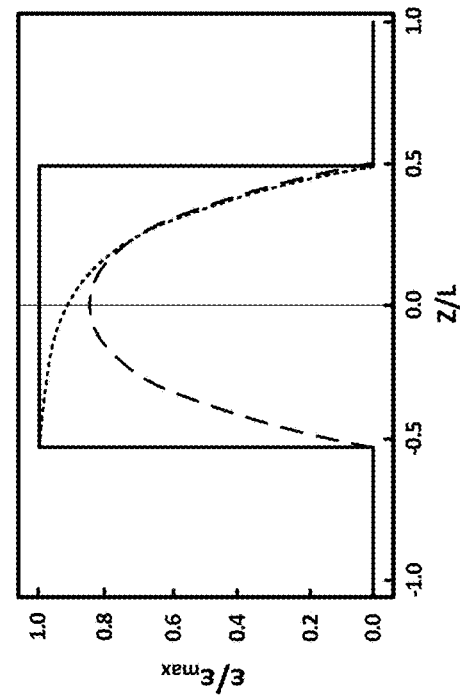
Figure 12C:
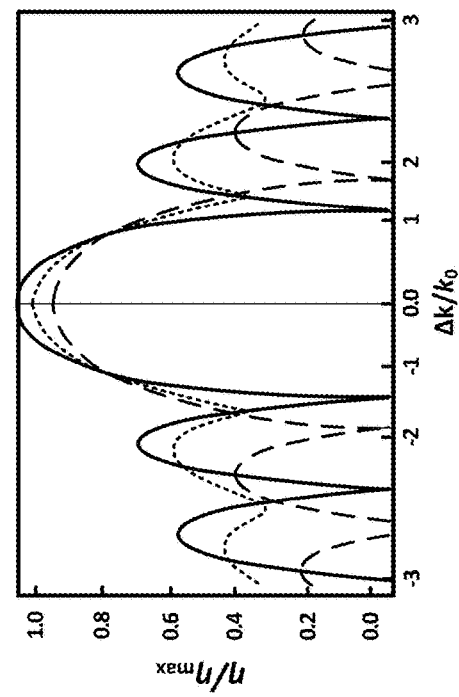

Creation of such gradient-index structures can also control other features of photo-sensitive materials in order to improve performance. FIGS. 12A-12C show holographic apodization through photopolymerization of a graded polymer structure near surfaces. FIG. 12A provides an illustration of how strong Beer-Lambert absorption can be used to locally photopolymerize a crosslinking monomer near surfaces, reducing holographic sensitivity. FIG. 12B illustrates three possible hologram profiles showing no apodization (solid), single sided (dotted) and double sided (dashed) exponential apodization. FIG. 12C shows the corresponding holographic efficiency in the weak limit showing order-of-magnitude suppression of the first sidelobe.

Some embodiments can be used to modify the holographic recording properties of the film as a function of depth. As shown in the calculation of 9A-9C, sidelobe suppression can be accomplished through this "apodization" of the hologram amplitude. As is well known in the art, such a smooth transition at the edges of the hologram reduces the sidelobes that appear in specular and/or angular Bragg selectivity curves. This could be accomplished, for example, by locally polymerizing a multifunctional, stiff monomer near the surface that would raise the glass transition temperature and thus suppress subsequent holographic recording response. This will, of course, sacrifice some of the potential efficiency, as shown in FIG. 12C at the Bragg matched center of the plot, but side lobes are shown to fall faster than peak efficiency.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "couples," or any variant thereof means any connection or coupling, either direct or indirect, between two or more elements; the coupling or connection between the elements can be physical, logical or a combination thereof. Additionally, the words "herein," "above," "below," and words of similar import, when used in this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
   depositing a photosensitive material onto a substrate having an index of refraction;
   formulating an elastomer with a refractive index that matches the refractive index of the substrate;
   incorporating an absorptive dopant into the elastomer to absorb specific wavelengths across an optical spectrum;
   laminating the elastomer to the substrate;

modifying, using a recording light, properties of the photosensitive material, wherein a portion of the recording light not absorbed by the photosensitive material is absorbed into the elastomer; and peeling the elastomer from the substrate.

2. The method of claim 1, wherein the absorptive dopant comprises one of nanoparticles, a dye, and pigments.

3. The method of claim 1, wherein the absorptive dopant comprises one of titanium dioxide, carbon black, chromophores, and photochromic materials.

4. The method of claim 1, wherein the modifying the properties of the photosensitive material comprises recording a hologram in the photosensitive material.

5. The method of claim 1, wherein the elastomer comprises one of polydimethylsiloxane and polyurethane.

6. The method of claim 1, further comprising incorporating a dopant with a refractive index different from the refractive index of the elastomer.

7. The method of claim 1, wherein the absorptive dopant has a varying concentration through a thickness of the elastomer.

8. The method of claim 1, wherein the elastomer is flexible to allow the elastomer to conform to a smooth surface.

9. The method of claim 1, wherein further comprising incorporating a conductor into the elastomer causing the elastomer to become electrically conductive.

10. The method of claim 9, further comprising heating the elastomer via Joule heating.

11. A method of film fabrication, the method comprising:
blending two or more polymers to create a polymeric layer to minimize optical reflections between a substrate and the polymeric layer;
incorporating an absorbing filler into the polymeric layer;
depositing a polymeric layer onto a carrier or mold;
processing the polymeric layer by photopolymerization; and
removing the polymeric layer from the carrier or mold.

12. The method of claim 11, further comprising applying the polymeric layer onto the substrate.

13. The method of claim 11, wherein the absorbing filler comprises one of a spectrally selective absorption dopant and a broadband absorption dopant.

14. The method of claim 11, wherein the absorbing filler includes a dopant with a refractive index different from the refractive index of the polymeric layer.

15. The method of claim 14, wherein the dopant comprises one of nanoparticles and a monomer.

16. The method of claim 11, wherein the polymeric layer includes a varying concentration of at least one polymer through the thickness.

17. The method of claim 12, further comprising applying a second substrate on an exposed surface of the polymeric layer.

18. The method of claim 17, wherein the polymeric layer comprises a first polymer with a first refractive index and a second polymer with a second refractive index, wherein the first refractive index matches a refractive index of the substrate, and wherein the second refractive index matches a refractive index of the second substrate.

19. The method of claim 18 further comprising photopolymerizing the first polymer by illuminating one side of the polymeric layer to create a concentration gradient of the first polymer in the polymeric layer.

20. The method of claim 19, wherein the one side of the polymeric layer is a side in contact with the substrate.

* * * * *